INVENTOR.
FREDERICK A. STONE
BY
ATTORNEYS

INVENTOR.
FREDERICK A. STONE
BY
ATTORNEYS

United States Patent Office 3,424,966

Patented Jan. 28, 1969

3,424,966
SYNCHRONOUS SERVO LOOP CONTROL SYSTEM

James E. Webb, Administrator of the National Aeronautics and Space Administration, with respect to an invention of Frederick A. Stone, North Branford, Conn.

Filed May 4, 1966, Ser. No. 547,677
U.S. Cl. 318—314 7 Claims
Int. Cl. H02p 5/00

ABSTRACT OF THE DISCLOSURE

A control system for a tape recorder playback motor in which derived signals from the tape are synchronized with signals from a clock signal source. An integrator circuit is provided which is charged to a fixed initial reference voltage lead when the clock signal occurs. As long as both signals are present, the integrator output falls slowly at a fixed rate. In the absence of one of the signals the integrator holds its output value. The output of the integrator is used to control an oscillator whose output drives the tape recorder playback motor.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to systems for synchronizing motor control speed, and more particularly to improvements therein.

Phase locked loop techniques have been employed for a number of years in those applications requiring precise frequency or speed control for a motor. A conventional system uses a phase comparing circuit to develop a voltage or current proportional to the relative phase or time displacement between two repetitive signals, one of which is generated by a local oscillator. This voltage or current output from the phase comparator is used to control the frequency of the local oscillator. If the other repetitive signal tends to advance in phase, relative to the local oscillator's signal, the resulting control signal to the local oscillator causes the local oscillator frequency to increase. Conversely if the other repetitive signal tends to retard in phase relative to the local oscillator's signal, the resulting control signal to the local oscillator causes the local oscillator frequency to decrease. In this manner the local oscillator frequency "locks" on the frequency of the other repetitive signal, and if the other repetitive signal frequency varies, the local oscillator frequency will follow it along with only some slight difference in phase between the two signals. The motor is usually driven from the local oscillator output.

In the use of these techniques for speed control systems for tape recorders, typically the phase of a 60 c.p.s. playback signal from one track of the tape is compared to a 60 c.p.s. master reference. The resulting phase comparator output signal controls the frequency of the 60 c.p.s. oscillator which powers a hysteresis synchronous motor driving the tape. The tape moves at a speed such that its output signal frequency matches exactly the master reference frequency. A separate track on the tape is usually used for the 60 c.p.s. playback signal. It has been found that the electromechanical speed control of the type described is inherently unstable, and without significant damping it will oscillate. The unstable condition results from the dynamics of the synchronous motor.

A conventional phase comparator output signal contains a ripple frequency component equal to or twice the frequency of the two signals which are compared. If one of these signals is the local oscillator, its frequency will not respond to the ripple component. But if the local oscillator operates at a much greater frequency, and its output frequency is divided down before reaching the phase comparator, its frequency will be modulated by the ripple component. In this case, the phase comparator output must be filtered before it is coupled to the local oscillator control input. When the frequency of the compared signals is very low (on the order of 1 c.p.s.) this filtering is not practical by conventional techniques.

An object of this invention is the provision of a speed control system for a motor which permits phase comparison of two signals whose frequency is much less than the local oscillator frequency in a manner to remove the motor dynamics from the control loop dynamics so that the control loop is stable without damping.

Another object of the present invention is the provision of a phase locked loop motor control system wherein the ripple frequency components which are present are too insignificant to adversely affect operation of the system.

Still another object of the present invention is to provide a novel and unique phase locked loop motor control system.

These and other objects of the present invention may be achieved in an arrangement wherein a sync signal is provided from a tape, and a clock signal is provided from a reference clock source, and it is desired that the sync pulses from the tape have exactly the same average frequency as the clock signal. This is accomplished by resetting a circuit, such as an integrator circuit by charging the integrator circuit to a fixed initial reference voltage level when the clock signal occurs. After the integrator circuit is first charged to the reference level, then as long as both signals continue to remain present, the integrator output falls slowly at a fixed rate. When one or the other of the inputs terminates, the integrator output holds at the value of output voltage it has at that time, until the next time both pulses are present at its inputs, at which time it is reset to repeat the process. The average output voltage of the integrator circuit thereby becomes a measure of the relative phase between the two signals which together determine the time period during which it integrates. The output of the integrator is used to control a voltage controlled oscillator whose output drives the tape recorder playback motor. Thus, the voltage controlled oscillator frequency, which is controlled with the amplitude of the integrator output, is varied, as the phase difference of the tape sync signal and clock signals vary, to minimize the phase difference.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Assume, for the purpose of explaining the operation of this invention, that sync signals which are recorded on a separate track on tape are to have exactly the same frequency as the frequency of a clock signal source. Some phase error or time displacement is allowed and this determines the width of the reference clock signal. For digital recording, the reference clock signal operates at a word repetition rate. A time displacement error somewhat less than plus or minus one-half the bit width is permitted so that the reference clock pulse signal is approximately one bit wide.

Figure 1:
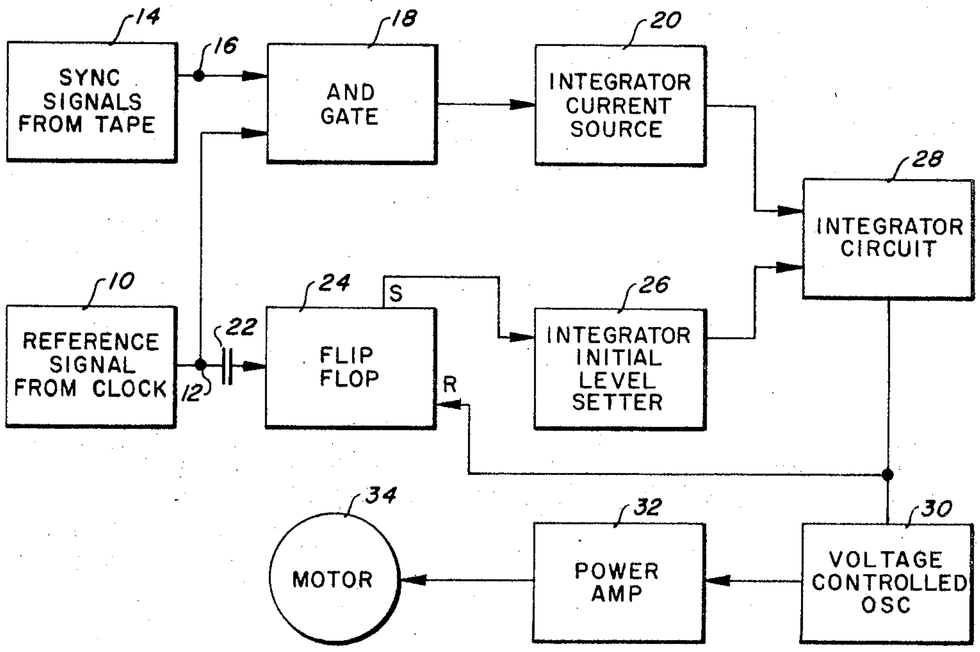
FIGURE 1 is a block schematic diagram of an embodiment of the invention.

Referring now to the schematic of the embodiment of the invention shown in FIGURE 1, reference signals from a clock pulse oscillator 10 are applied to a first input terminal 12 of the invention. Sync signals 14 which are derived from a sync signal track on the tape are applied to a second input terminal 16 of the embodiment of the invention. Both signal inputs are connected through the input terminals to an And gate 18. In the presence of both inputs, the And gate applies an output to an integrator current source which is maintained turned on for so long as both And gate inputs are present.

The output of the reference signals from the clock source 10 are applied through a capacitor 22 to a flip-flop circuit 24, which is driven to its "set" state thereby. The flip-flop circuit, when in its set state, turns on circuitry designated as Integrator Initial Level Setter 26. This circuitry, when the integrator current source 20 is turned on, quickly charges up the integrator circuit 28 to a fixed reference level voltage. The output of the integrator, indicative of the reference level having been attained, is applied to the flip-flop 24 to drive it to its reset state. Thereby, the integrator level setter 26 is turned off. However, the integrator current source remains on reducing the level to which the integrator circuit 28 has been set at a predetermined rate.

When one or the other of the two inputs from the sync signal and the reference signal sources are terminated, the integrator current source is no longer operative to further reduce the integrator circuit output voltage. The integrator circuit holds the output voltage level to which it is set until the next occurrence of both sync signal and reference signal. The output of the integrator circuit 28 is applied to a voltage controlled oscillator 30. This oscillator provides an output signal whose frequency is determined by the amplitude of the voltage received from the integrator circuit. Accordingly, its frequency is established essentially by the level of the integrator circuit output which is essentially determined by the phase difference of the two inputs to the circuitry. The output of the voltage controlled oscillator is amplified by a power amplifier 32, whose output is thereafter applied to drive a motor 34 for the tape recorder playback.

Figure 2:
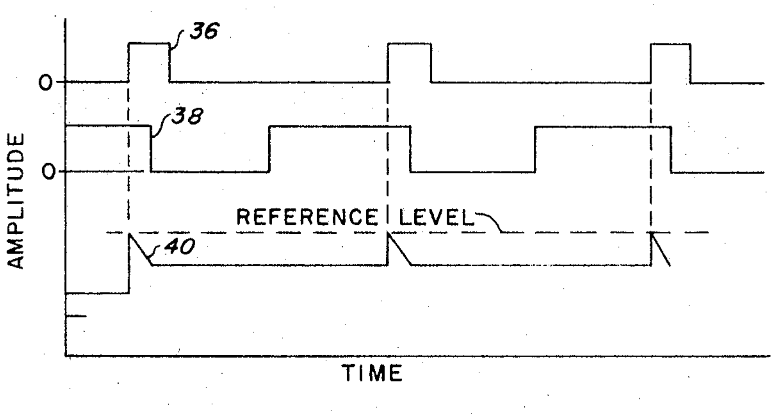
FIGURE 2 is a pulse waveform diagram shown to assist in an understanding of the invention.

FIGURE 2 shows input pulses 36 which are received from a reference clock source. The waveform 38 is the second input representing the word sync pulses received from the tape. The waveform 40 shows the output of the integrator circuit. When there is an occurrence of waveforms 36 and 38, the integrator voltage increases rapidly to a predetermined reference level. During the period of overlap of the sync signals, there is a reduction in the output of voltage of the integrator at a fixed rate. Upon the discontinuance of one or the other of the two input signals, the integrator output is maintained at the level reached at the time the signals were no longer simultaneously present.

Figure 3:
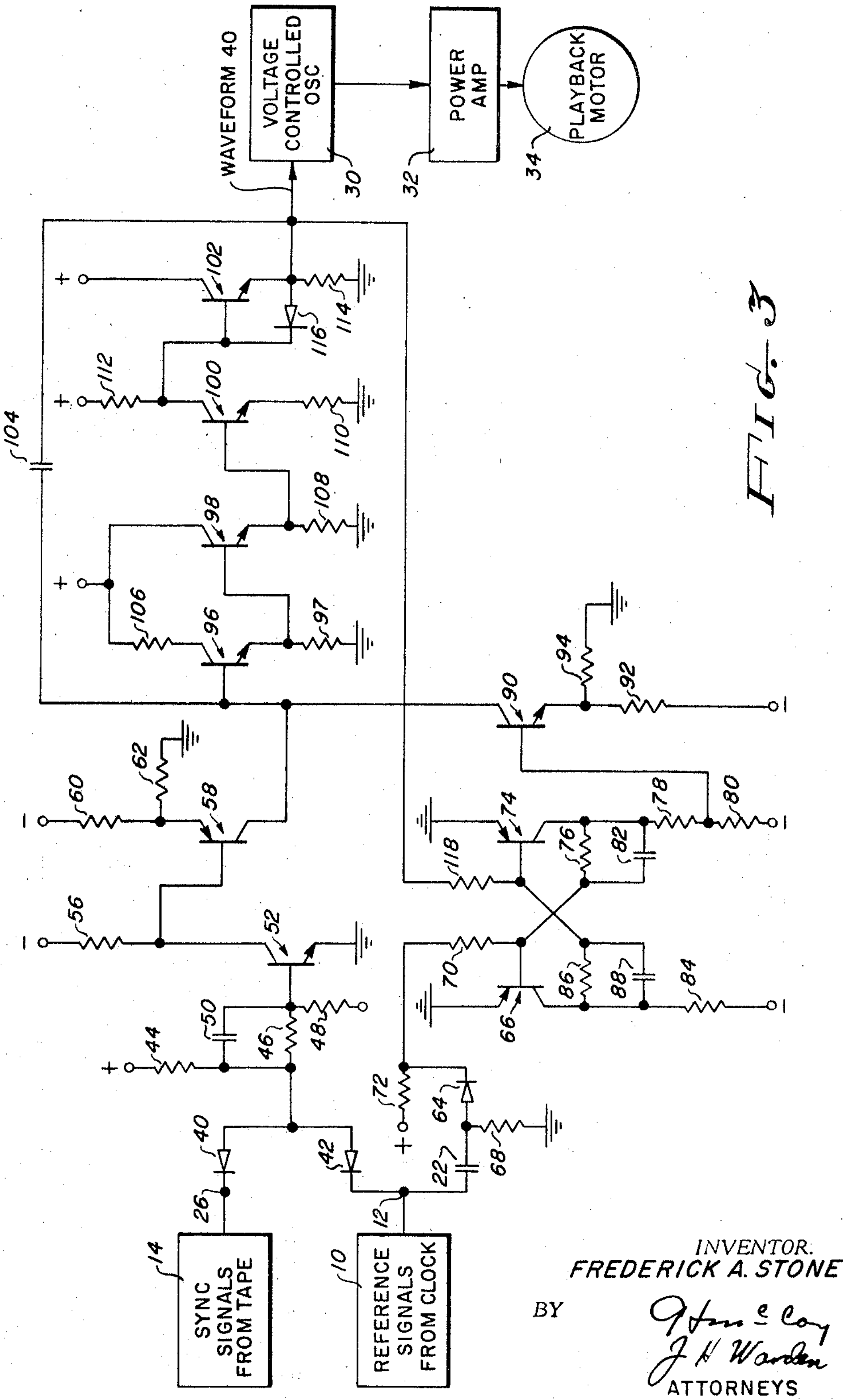
FIGURE 3 is a circuit diagram illustrative of circuitry of a type suitable for use in the invention for comparing phase and controlling an integrator with the result.

FIGURE 3 is a circuit diagram illustrating, by way of example, the circuitry including the And gate 18, the flip-flop 24, the integrator current source 20, the integrator level setter 26, and the integrator circuit 28, shown for the purposes of exemplification of suitable circuitry for this invention. The And gate 18 includes a first and second diode respectively 40, 42, and three series connected resistors, respectively 44, 46, and 48. These three resistors are connected across a suitable source of potential. The diode 40 is connected between the input terminal 26 and the junction of resistors 44 and 46, and the diode 42 is connected between the input terminal 12 and the junction between resistors 44 and 46. A capacitor 50 bypasses resistor 46. Output from the And gate is taken from the junction between resistors 46 and 48 and is applied to the base of a transistor 52. Transistor 52 has its emitter connected to ground and has its collector connected to a source of operating potential through two series connected resistors respectively 54 and 56. The junction of resistors 54 and 56 is connected to the base of a second transistor 58. This second transistor has its emitter connected to a voltage divider consisting of two serially connected resistors 60 and 62, which are connected across a source of operating potential.

Transistors 52 and 58 constitute the integrator current source. They are normally nonconductive and are rendered conductive only when the inputs applied to the diodes 40, 42 are simultaneously of positive potential. The inputs to diodes 40 and 42 comprise two positive pulses which block the diodes from conducting current through resistor 44 whereupon current flow through the two diodes 40, 42 is terminated, causing an output pulse to be applied to transistor 52 rendering it conductive and in turn, rendering the transistor 58 conductive.

Upon the occurrence of the reference signals from the clock source, a pulse is applied through capacitor 22 and through diode 64 to the base of transistor 66. The junction between capacitor 22 and diode 64 is connected to ground through a resistor 68. The base of transistor 66 is connected through a resistor 70 to the diode 64. A resistor 72 also is connected to a positive potential source and to resistor 70.

Transistor 66 and a second transistor 74, together with the resistive and capacitive circuitry therebetween, form a flip-flop circuit. The remaining circuit components comprise a resistor 76 which connects the base of transistor 66 to the collector of transistor 74. Resistor 78 and 80 are connected in series between the collector of transistor 74 and a source of negative potential. A capacitor 82 bypasses the resistor 76 to high frequency signals. The emitter of transistor 74 is connected to ground as well as the emitter of transistor 66. The collector of transistor 66 is connected through a resistor 84 to a source of negative potential. The collector of transistor 66 is also connected through a resistor 86 to the base of transistor 74. A capacitor 88 bypasses resistor 86 to high frequency signals.

The junction of resistors 78 and 80 are connected to the base of a transistor 90. The emitter of this transistor 90 is connected to the junction of two resistors respectively 92, 94, which are connected in series across a source of operating potential.

The integrator circuit 28 comprises four transistors respectively 96, 98, 100, 102. A capacitor 104 is connected between the input to the integrator which is the base of transistor 96 and the output of the integrator which is the emitter of transistor 102. Transistor 96 has its emitter connected to ground through a resistor 97 and to the base of transistor 98. A source of positive operating potential is connected through a resistor 106 to the collector of transistor 96 and is connected directly to the collector of transistor 98. The emitter of transistor 98 is connected to ground through a resistor 108 and is connected to the base of transistor 100. The emitter of transistor 100 is connected to ground through a resistor 110. The collector of transistor 100 is connected through a resistor 112 to the positive source of operating potential. The collector of transistor 100 is connected to the base of transistor 102. The collector of transistor 102 is connected to a source of positive operating potential. The emitter of transistor 102 is connected to ground through a resistor 114. A diode 116 is connected between the base and the emitter of transistor 102.

Upon the occurrence of a reference or clock pulse, the flip-flop consisting of transistors 66 and 74 is driven to its set state whereby transistor 66 is rendered nonconductive. This turns on transistors 74 and 90. The change in potential at the base of transistor 96 caused by transistor 90 becoming conductive causes a heavy current to flow from the emitter of transistor 102 through capacitor 104 and through transistor 90 to the negative potential source. This current causes the terminal of capacitor 104 connected to the emitter of transistor 102 to rapidly become more positive with respect to its other terminal connected to the base of transistor 96. While the potential at the base of transistor 96 remains near zero, the potential at the emitter of transistor 102, which is the output of the integrator circuit, rapidly rises. This may be seen in FIGURE 2 by referring to waveform 40, in particular its rapid increase in potential that occurs simultaneously with the beginning of each positive pulse of waveform 36.

When the voltage at the emitter of transistor 102, the integrator output voltage, reaches a predetermined value, this voltage applied to the base of transistor 74 through resistor 118 causes the flip-flop circuit to revert to its reset state and turns off transistor 90 to terminate the charging of capacitor 104. This occurs when the integrator output voltage reaches the "reference level" depicted in waveform 40.

If both transistors 90 and 58 were then to remain nonconducting, the output voltage of the integrator circuit would tend to remain at the reference level indefinitely. However, if both input 1 and input 2, waveforms 36 and 38 respectively, are positive, a current flows from the positive source of potential through resistor 60 and transistor 58 into the integrator circuit. The magnitude of the current is determined by the value of resistor 60. During this time the output voltage of the integrator will fall, as capacitor 104 is discharged, the rate of fall being related to the current through resistor 60 and the value of capacitor 104. This reduction in the output voltage of the integrator at the emitter of transistor 102 may be seen in FIGURE 2 by referring to waveform 40, in particular the segments of waveform 40 having a negative slope which occur whenever both waveforms 36 and 38 are simultaneously positive in potential.

During this "integrating" period when both waveforms 36 and 38 are simultaneously positive, the integrator output voltage at the emitter of transistor 102 falls at a fixed rate. When one or the other or both waveforms 36 and 38 fall to zero, transistor 58 turns off and the integration process ceases. The integrator output voltage will tend to remain at the level it had at the instant when the integration process stopped.

Since the integrator output voltage begins its reduction from a fixed reference level when both waveforms 36 and 38 first become concurrently positive, and since the rate at which the voltage reduces is fixed by circuit component parameter values, the voltage which is held by the integrator circuit after integration stops is a measure of the relative overlap between waveforms 36 and 38; the greater the period during which they overlap the lower the resulting integrator output voltage.

The process of resetting to the fixed reference level followed by integration to measure the relative phase is repeated each time a reference clock pulse occurs.

There has accordingly been described and shown hereinabove a novel, useful and unique system for synchronizing the speed of a playback motor for a tape recorder with reference signals. Since the speed correction is made very quickly during a very brief period, as long as the motor can respond quickly its dynamics do not cause instability. The memory feature of the integrator causes the system to run at constant speed during the integration period. This permits comparison of very low frequency pulses.

What is claimed is:

1. In a system of the type wherein a tape recorder playback motor moves tape and means are provided for deriving synchronizing signals from the tape and it is desired to synchronize the operation of the tape playback motor with signals from a source of clock signals, the improvement comprising a first and a second input terminal, means responsive to the simultaneous application to said first and second input terminals of a sync signal and a clock signal for establishing a control signal representative of the duration of the simultaneous application of said sync signal and clock signal to said first and second input terminals, means for maintaining said control signal upon the termination of a clock or sync signal until the next simultaneous application of a clock and sync signal to said first and second terminals, and means for controlling the speed of said playback motor responsive to said control signal including:

oscillator means the frequency of which may be controlled by an input signal, means for applying said control signal as an input signal to said oscillator means, and means for applying output from said oscillator means to said tape playback motor.

2. In a system of the type wherein a tape recorder playback motor moves tape and means are provided for deriving synchronizing signals from the tape and it is desired to synchronize the operation of the tape playback motor with signals from a source of clock signals, the improvement comprising a first and a second input terminal, means responsive to the simultaneous application to said first and second input terminals of a sync signal and a clock signal for establishing a control signal representative of the duration of the simultaneous application of said sync signal and clock signal to said first and second input terminals including:

means for establishing a reference level signal, and means for altering said reference level signal at a constant rate during the simultaneous application of said sync signal and clock signal to said first and second input terminals to establish said control signal, means for maintaining said control signal upon the termination of a clock or sync signal until the next simultaneous application of a clock and sync signal to said first and second terminals, and means for controlling the speed of said playback motor responsive to said control signal.

3. In a system of the type wherein a tape recorder playback motor moves tape and means are provided for driving synchronizing signals from the tape and it is desired to synchronize the operation of the tape playback motor with signals from a source of clock signals, the improvement comprising a first and second input terminal, an integrating circuit having an input and an output, means responsive to one of the said inputs to cause said integrator circuit to provide an output voltage at a fixed reference level, means responsive to the simultaneous application of said first and second input terminals of a sync signal derived from the tape and a clock signal for causing a signal to be applied to the input of said integrator and causing the output voltage of said integrator to fall at a predetermined rate, means for terminating the operation of said means for reducing the output voltage of said integrating circuit at a predetermined rate upon the termination of either of the signals applied to the input terminals, and means for controlling the speed of said playback motor responsive to the output of said integrating circuit.

4. In a system of the type wherein a tape recorder playback motor moves tape and means are provided for deriving synchronizing signals from the tape and it is desired to synchronize the operation of the tape playback motor with signals from a source of clock signals, the improvement comprising a first and a second input terminal, an integrating circuit having an input and an output, a bistable state circuit having a first and second input for respectively driving said bitsable state circuit to a first and a second stable state, means coupling said first bistable state circuit input to said second input terminal, means coupling said second bistable state input to the output of said integrator circuit, means for applying a clock pulse to said second input terminal for driving said bistable state circuit to its first stable state, means for applying a sync pulse to said first input terminal, means responsive to said bistable state circuit being in its first stable state and to the application of a clock pulse to said first input terminal for applying a signal to the input of said integrator circuit to cause said integrator circuit to produce an output voltage at a predetermined reference level whereafter said bistable state circuit is driven to its second stable state, means responsive to said bistable circuit being in its second stable state and the presence of said sync pulse and said clock pulse at said first and second input terminals for reducing the output of said integrating circuit from said voltage reference level at a predetermined rate, and means for controlling the speed of said playback motor responsive to the output of said integrating circuit.

5. In a system of the type wherein a tape recorder playback motor moves tape and means are provided for deriving synchronizing signals from the tape and it is desired to synchronize the operation of the tape playback motor with signals from a source of clock signals, the improvement comprising a first and a second input terminal, a source of operating potential, a first transistor having an emitter, base and collector electrode, a second transistor having an emitter, base and collector electrode, an integrator circuit having an input terminal and an output terminal, means connecting the collectors of said first and second transistors to said integrating circuit input terminal, means responsive to the simultaneous presence of a sync signal applied to said first input terminal and a clock signal applied to said second input terminal from said respective sources, for applying a first signal to the base of said first transistor and a second signal to the base of said second transistor for rendering them conductive for driving said integrator to increase its output to a predetemined reference voltage level, means responsive to said integrator producing an output having said predetermined reference voltage level for rendering said second tansistor inoperative, means responsive to the discontinuance of one of the input signals applied to said first and second input terminals for rendering said first transistor inoperative, and means for controlling the speed of said playback motor responsive to the output of said integrating circuit.

6. In apparatus as recited in claim 5 wherein said means for applying a second signal to the base of said second transistor to render it conductive and for thereafter rendering said second transistor inoperative when said integrator circuit output attains a predetermined reference voltage level comprises a flip-flop circuit having a first and a second input the applications of signals to which respectively drives said flip-flop circuit to a first and a second stable state, means connecting said flip-flop circuit first input to said second input terminal, means connecting said flip-flop circuit second input to said integrating circuit output terminal, and means connecting the output of said flip-flop circuit when in its first stable state to the base of said second transistor.

7. Apparatus as recited in claim 5 wherein said means for applying a first signal to said first transistor base for rendering it conductive upon the simultaneous application of a sync signal to said first input terminal and a clock signal to said second input terminal includes a coincidence gate having a first and a second input and providing an output only in the presence of signals applied to its first and second input, means connecting said first input of said coincidence gate to said first input terminal, means connecting the second input of said coincidence circuit to said second input terminal, and means connecting the output of said coincidence circuit to the base of said first transistor.

References Cited

UNITED STATES PATENTS

| | | | |
|---|---|---|---|
| 3,008,075 | 11/1961 | Scott | 318—314 |
| 3,355,649 | 11/1967 | Boylan et al. | 318—314 |
| 3,356,921 | 12/1967 | Bradford et al. | 318—314 X |

ORIS L. RADER, *Primary Examiner.*

GENE RUBINSON, *Assistant Examiner.*

U.S. Cl. X.R.

318—329